United States Patent [19]

Hewett et al.

[11] Patent Number: 4,554,839

[45] Date of Patent: Nov. 26, 1985

[54] MULTIPLE TROUGH VESSEL FOR AUTOMATED LIQUID HANDLING APPARATUS

[75] Inventors: Gary E. Hewett, San Francisco; Brian G. Atwood, Walnut Creek; Timothy J. Wennberg, San Francisco, all of Calif.

[73] Assignee: Cetus Corporation, Emeryville, Calif.

[21] Appl. No.: 542,114

[22] Filed: Oct. 14, 1983

[51] Int. Cl.[4] .............................................. G01N 35/06

[52] U.S. Cl. .............................. 73/864.16; 73/863.32; 422/65; 422/100

[58] Field of Search ........... 73/863.32, 864.16, 864.17, 73/864.22, 864.24, 864.25, 864.14; 422/65, 100

[56] References Cited

U.S. PATENT DOCUMENTS

| | | | |
|---|---|---|---|
| 3,325,000 | 6/1967 | Edwards | 206/56 |
| 3,443,439 | 5/1969 | Cruz | 73/864.25 X |
| 3,776,184 | 12/1973 | Harrison | 73/864.24 X |
| 3,853,217 | 12/1974 | Scordato et al. | 206/223 |
| 3,900,289 | 8/1975 | Liston | 73/864.25 X |
| 3,912,456 | 10/1975 | Young | 73/864.25 X |
| 4,047,438 | 9/1977 | Sekine | 73/863.32 |
| 4,140,018 | 2/1979 | Maldarelli et al. | 73/864.25 X |
| 4,167,875 | 9/1979 | Meakin | 73/864.25 X |
| 4,235,840 | 11/1980 | Mendoza et al. | 73/864.25 X |
| 4,311,667 | 1/1982 | Gocho | 73/864.24 X |
| 4,322,216 | 3/1982 | Lillig et al. | 73/864.25 X |
| 4,478,094 | 10/1984 | Salomaa et al. | 73/863.32 |

FOREIGN PATENT DOCUMENTS

| | | | |
|---|---|---|---|
| 39792 | 4/1978 | Japan | 73/864.25 |

*Primary Examiner*—Robert Spitzer
*Attorney, Agent, or Firm*—Albert P. Halluin; Janet E. Hasak; Thomas E. Ciotti

[57] ABSTRACT

Apparatus for accurately transferring liquids for filling or diluting microliter quantities of regents, analytes or cells for bioassays and the like include a vessel having a plurality of troughs for supplying an array of pipettes to effect the transfer. The vessel is automatically indexable on a horizontal table to bring a selected trough into register with vertical movement of the pipette tips. The table is then indexed to bring the tips into alignment with a plurality of microtiter tray wells. In a preferred form the troughs are of different widths to supply differing quantities of liquid to the pipettes for transfer.

4 Claims, 8 Drawing Figures

MULTIPLE TROUGH VESSEL FOR AUTOMATED LIQUID HANDLING APPARATUS

FIELD OF THE INVENTION

The present invention relates to multiple trough vessels for liquid handling in automatic liquid transfer apparatus using a plurality of pipettes or syringes.

The invention has for a particular object providing in a single vessel a plurality of troughs of different widths and/or depths for simultaneously filling a plurality of microtitre wells on a unitary plate with a selectable liquid, such as reagents, analytes or cells for biochemical or other assays. In a preferred form of the invention, the vessel is formed as a rectangularly molded unit having a top support surface and integral vertical walls. A plurality of parallel troughs extend longitudinally substantially completely between a pair of opposed walls and are formed to suspend from said top support surface. Desirably, the troughs hold different volumes of liquid by forming them of different widths. Each trough is characterized by the longitudinal side walls thereof being inclined inwardly toward each other and the bottom of the walls terminating in a curved portion to permit a plurality of pipette tips, immersed in liquid held by the trough, to be completely emptied thereby. In a further preferred embodiment of the invention the top support surface includes an elongated flat portion having a plurality of aligned sockets or storage holes for mounting a plurality of replaceable tips for each of an elongated row of pipettes or syringes. Such aligned holes may be in a single row or in adjacent double rows, or a single row adjacent opposed a vessel wall and parallel to the length of the troughs.

BACKGROUND OF THE INVENTION

In a copending application Ser. No. 489,866, filed May 5, 1983, assigned to the assignee of the present invention, there is disclosed an automatic liquid transfer apparatus for simultaneously filling or diluting, or both, a multiplicity of wells or sample holders, in a microtitre tray for tissue culture and assay of biochemical or chemical reactions. The disclosure of said application is incorporated into this specification by reference thereto. As therein disclosed, a plurality of aligned pipettes, each having a replaceable and disposable tip, are arranged to fill or dilute a multiplicity of wells, generally 24, 48 or 96, organized in an array eight or twelve wells wide. Each well is sized to contain from a few tenths of a milliliter to about ten milliliters. In general such wells may initially be filled by a manifold system including a metering pump and a fill tube associated with but external to each pipette tip. Such filling is quite satisfactory for many purposes, but frequently it is desirable to fill each well, either singly or as a group with a precise amount of liquid. Such precision is desirably within 1% over a range of from about 1 or less to 1000 or more microliters. Further a common manifold or common pump is not suitable for filling or transferring diverse fluids either singly or simultaneously to such a multiplicity of tray wells. For such accuracy the use of the pipettes, including the replaceable tips in accordance with the disclosure in the above-noted application, is essential. A convenient source of a plurality of liquids, such as reagents, analytes, or cell cultures, to be picked up and transferred by such pipettes is also essential for completely automatic operation of the system. Such trays may also be used to collect waste from the microtitre wells or receptacles.

SUMMARY OF THE INVENTION

The present invention provides for an automatic liquid transfer apparatus with a vessel for supplying any of a plurality of liquids simultaneously to microtitre tray wells and the like, either singly or in a ganged group. The trough vessel is arranged on a table to be programmed to an indexed position on a horizontal bed under one or a plurality of pipette heads for precisely imbibing a given quantity of liquid for transfer to a plurality of microtitre tray wells; the tray is also horizontally indexable on the same translating table as the trough vessel. Also in accordance with movement of the trough vessel and tray carrying table in a horizontal plane, one or more pipette heads is vertically reciprocated to engage or disengage with the injection end of the pipette or syringe removable tips in a storage rack on the table. The tips are immersed in the trough and fluid is drawn into the tip through the pumping action of a reciprocating piston in the barrel of the pipette. In a preferred form, the liquid supply vessel is formed with a plurality of elongated liquid containing troughs parallel to each other and extending substantially the width of the vessel. Desirably, but not necessarily, the individual troughs are of different volumes and are configured to accept the tips of a plurality of aligned pipettes simultaneously lowered into one of the troughs. Further the trough vessel may include means for mounting a plurality of pipette tips in parallel to the troughs and either disposed in a plurality of rows on one side of the trough or on opposite sides of the vessel. In a preferred form, the trough vessel is formed as a unitarily molded unit having a top support surface with a plurality of troughs depending from the surface and each trough extending substantially from one sidewall to the opposite sidewall. Each of the sidewalls is preferably vertically inclined and the troughs are desirably formed so that the elongated walls of each trough are inclined inwardly toward each other and are joined by a concave curved portion so that the immersed pipette tips may completely empty liquid from the trough.

Further objects and advantages of the present invention will become apparent from the following detailed description, taken in conjunction with the accompanying drawings which form an integral part of the present specification.

DESCRIPTION OF THE PREFERRED EMBODIMENT

Figure 1:
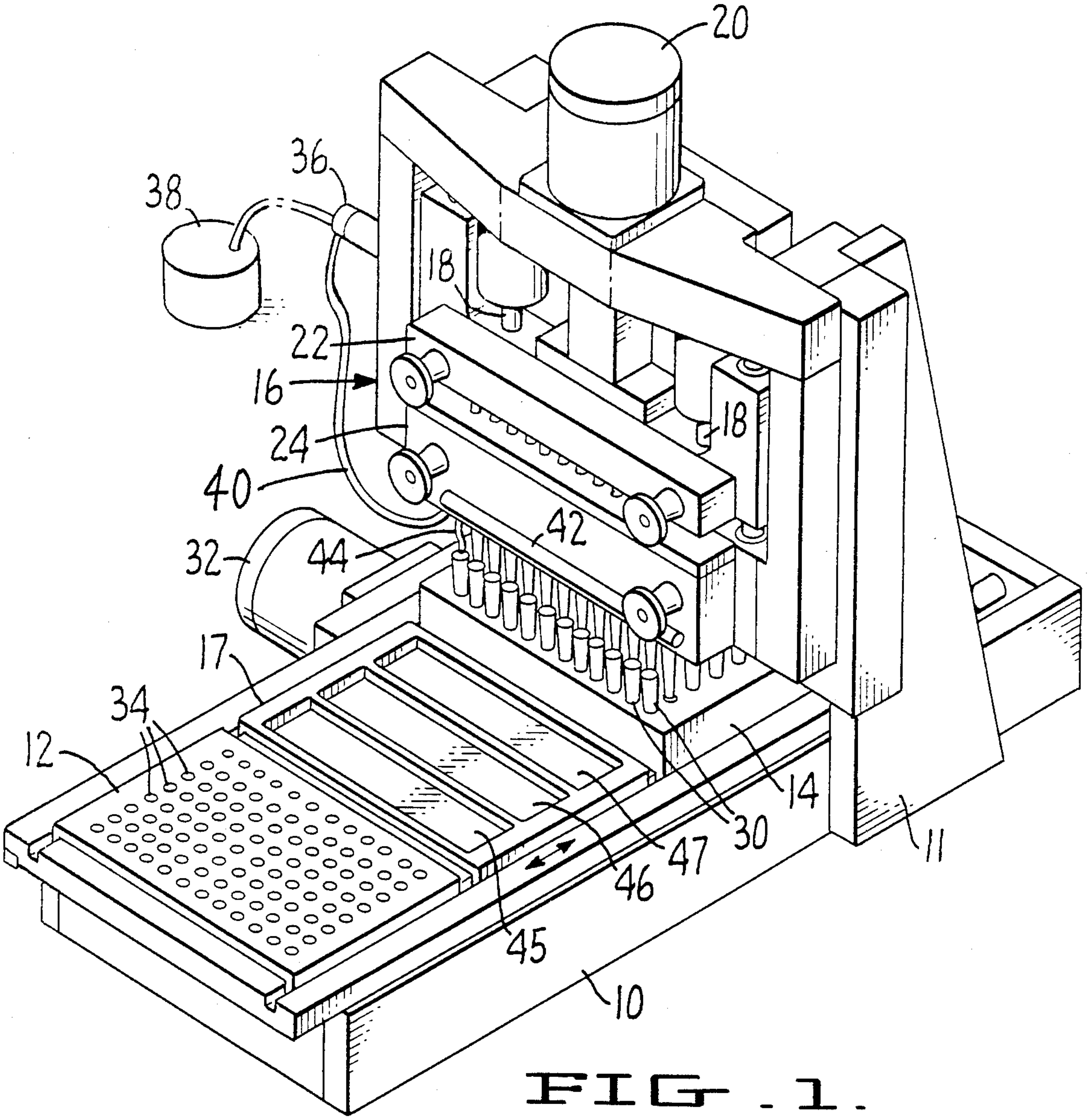
FIG. 1 is a perspective view of an automatic liquid transfer apparatus using a plurality of vertically reciprocable pipette members cooperating with a moveable table which includes a storage rack for pipette tips, a microtitre tray having a plurality of wells, and a liquid vessel having a plurality of filling troughs for supplying or transferring liquids to the microtitre tray wells.

In accordance with the present invention the arrangement of FIG. 1 is generally described in the above-noted application Ser. No. 489,866, now U.S. Pat. No. 4,478,098. In general it comprises a support bed 10 upon which a horizontally reciprocable table 12 is indexable selectively to bring a rack 14 of pipette tips 30 under a pipette head assembly 16. Head assembly 16 is vertically translatable up and down along vertical rods 18 and through gearing (not shown) driven by motor 20. Head assembly 16 includes pipette barrel support portion 24 carrying a row of pipette heads (not shown) whose depending ends are adapted to receive tips 30. Piston support section 22 carries a row of pistons or plungers respectively disposed within each of the pipettes (not shown). Movement of barrel portion 24 relative to piston portion 22 pumps the plungers within the pipette barrels to vary the internal volume of the pipette and the tips 30 for aspiration or injection of liquid. As noted above, table 12 moves on bed 10 along a horizontal plane and is automatically indexable to bring the table into any of several work positions underneath the pipette tips. Drive of the table is by a rack and pinion arrangement (not shown) driven by motor 32.

As further disclosed in the above-noted application tips 30 are adapted to be replaced after each use to move fluid either from one row of wells 34 to another in tray 12, (for dilution) or from a trough 45, 46 or 47 of liquid supply vessel 17 into any of the pipette wells 34 in microtitre tray 12. After each use, tips 30 are returned to rack 14 and another set picked up, after the first set of tips are disposed of. Such an arrangement prevents cross contamination of either the supply liquid in vessel 17 or liquid in different wells. Additionally, the present arrangement of multiple troughs permits use of one or more of such troughs to be used to wash the tips between uses. Such washing may permit the same tips to be used for a plurality of transfer steps without replacement or disposal of the tips.

As further indicated schematically in FIG. 1, wells 34 of tray 12 may be filled through a pump mechanism including pump 36 carried on vertical frame 11 to supply liquid from a reservoir such as tank 38 through tube 40 to a header or manifold 42 also carried by pipette assembly 24. With such an arrangement, the discharge ends of individual tubes 44 are disposed directly adjacent to the pipette tips to feed liquid either simultaneously or selectively to any of wells 34.

While the foregoing arrangement for filling multiple wells 34 is satisfactory for many purposes, in accurate assays it is frequently necessary to control the amount of liquid to within less than 1% of the total volume added to each well 34, and such accuracy must be maintained for any liquid transferred. For example, many bioassays require transfer of multiple liquids, of different composition or concentrations, or both. Accordingly it has been found that accuracy is only attainable using a calibratable pipette system and a dispensing vessel including a plurality of troughs.

Figure 2:
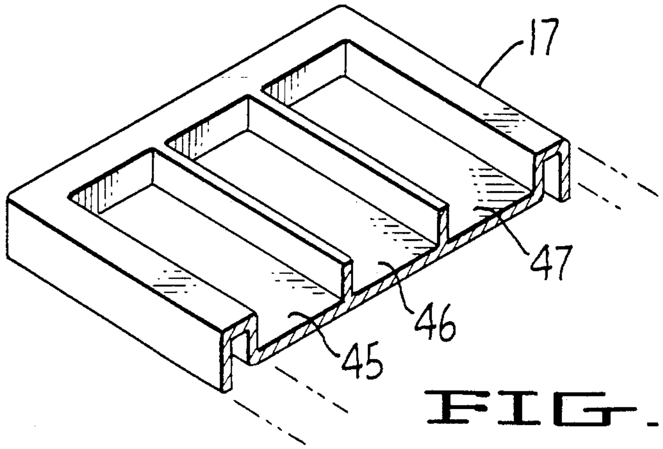
FIG. 2 is a perspective cross-sectional view through the trough vessel shown in FIG. 1.

One suitable form of vessel for use in the liquid transfer apparatus of FIG. 1 is shown in greater detail, and in cross-section, in FIG. 2. As there indicated the tray may be formed of a single plastic casting or molding so that three troughs 45, 46 and 47 extend from end to end and are aligned parallel to a row of pipette tips 30 carried by head assembly 16. With vessel 17 so disposed, horizontal translation of table 12 brings the center of any one of troughs 45, 46 or 47 under the pipette tips. Desirably, the relatively flat bottoms, as shown in FIG. 2 of individual troughs 45, 46 and 47 are tilted slightly toward their center and away from their sidewalls to permit all of the liquid to be aspirated into the individual tips when at the bottom of the trough.

Figure 3:
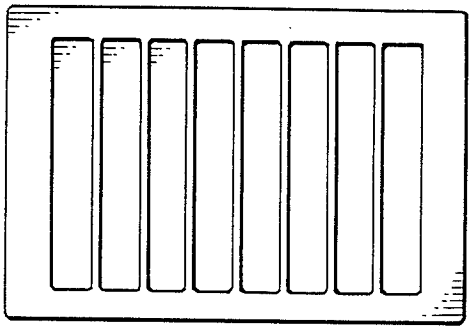
FIGS. 3, 4, 5 and 6 are plan views of alternate forms of liquid trough vessels useful in the arrangement of FIG. 1, having troughs extending between opposite sides of the vessel, with or without intermediate transverse dividers.

FIG. 3 is an alternative arrangement to that shown in FIG. 2 and indicates in plan view that the arrangement of troughs may be at right angles and the number of troughs substantially increased by turning the vessel at 90° to the arrangement shown in FIGS. 1 and 2.

Figure 4:
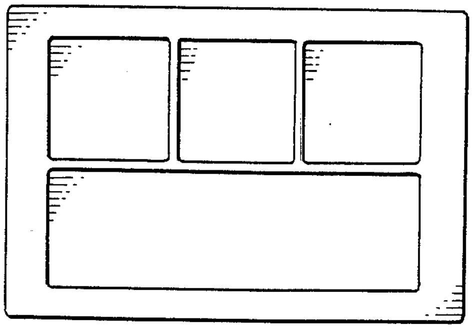
Figure 5:
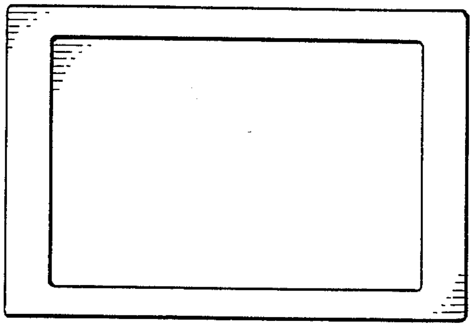

The arrangements of FIGS. 4 and 5 show in plan view the top surface of the vessels particularly suited for aspirating liquid from individual troughs, either simultaneously into a row of, say 12, pipette tips or by a single pipette carrying head which is moveable transversely to the direction of travel of table 12.

Figure 6:
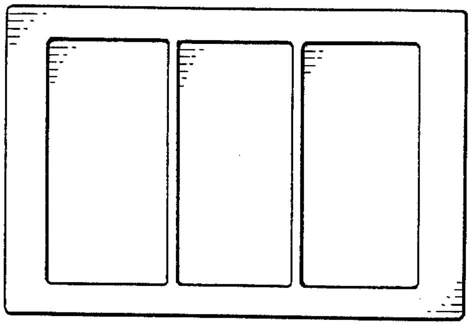

FIG. 6 illustrates also in plan view, a vessel having three transverse troughs for distributing reagents, analytes, or biological cell cultures to the individual microtitre wells.

Figure 7:
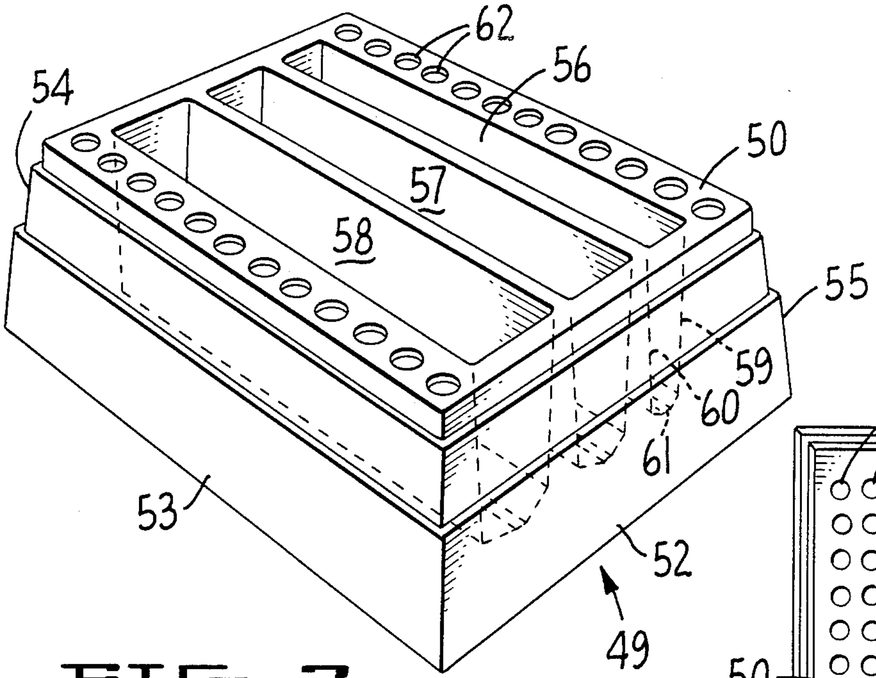
FIG. 7 illustrates a preferred embodiment of a trough vessel suitable for use in the arrangement of FIG. 1 which includes a plurality of elongated troughs of different volumetric capacity and a plurality of rows of storage openings or pigeon holes for storage of replaceable pipette tip members adjacent opposite vessel sidewalls.
Figure 8:
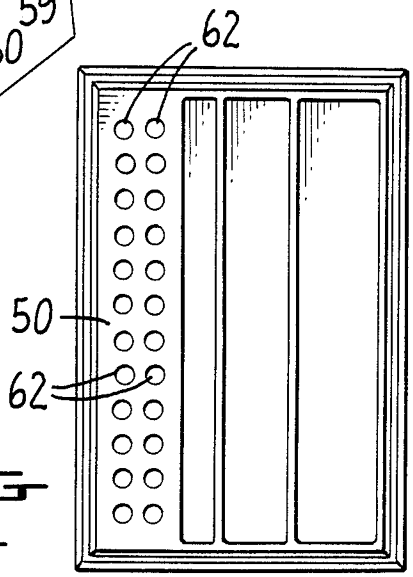
FIG. 8 is a plan view of an alternate arrangement, similar to FIG. 7, in which the pigeon holes are arranged in parallel rows adjacent one side wall of the trough vessel.

FIG. 7 and 8 illustrate preferred embodiments of vessels having troughs constructed in accordance with the present invention. It will be seen that these vessels have a top surface 50, as in vessel 49 shown in FIG. 7, which is formed integrally with four vertically inclined sidewalls 52, 53, 54 and 55. As so molded, vessel 49 is in the form of a truncated pyramid. Parallel troughs 56, 57 and 58 extend longitudinally substantially between walls 52, and 54 and are formed integrally with top support surface 50 so that they are suspended therefrom. It will be seen by the dotted line cross-section that each trough includes, as in trough 56, a pair of longitudinal sidewalls 59 and 60 which are also inclined inwardly toward each other. The base of said walls, as at bottom 61, terminates in a concave curved portion so that when the replaceable tips have their intake ends disposed at bottom 61 substantially all of the liquid may be aspirated into the tip from trough 56. Parallel troughs 57 and 58 are similarly configured except that the volume is preferably arranged so that successively, trough 57 is larger than 56, and 58 in turn is larger than trough 57.

As further indicated top surface 50 includes a row of tip storage sockets or "pigeon" holes 62 which are disposed along each of longitudinal sides 55 and 53. Such sockets may be used for either storing a spare set of tips or for disposal of a set of used tips after the array is used to fill or transfer liquids from one set of wells or troughs. By this arrangement it is also possible to re-use individual tips to fill wells where the same liquid is dispensed in different steps. The particular advantage of forming storage holes 62 in the top of 50 is to increase speed of operation by avoiding the necessity for returning to storage rack 14, as in FIG. 1, to obtain another set of pipette tips. In addition, the extra tip storage rack increases the number of operations that can be performed before additional tips are supplied to the machine.

FIG. 8 shows an alternate embodiment of the arrangement of FIG. 7, wherein both rows of holes 62 are disposed at one side of the surface 50.

While the foregoing description has been particularly directed to use of an array of tips, as indicated in FIG. 1, it is also within the purview of the present invention to use a single pipette head. In such an arrangement, the pipette body is carried by a single support unit and is supported on transverse rods and motor driven by a lead screw to any desired position across the width of mounting head 16. Such a system is disclosed in a patent application assigned to the assignee of the present invention and filed concurrently herewith. The disclosure of said application is also incorporated into this specification by this reference to it.

While various modifications and changes will occur to those skilled in the art from the abovedescribed embodiments all such modifications coming within the scope of the appended claims are intended to be included therein.

What is claimed is:

1. In a machine for automatically transferring at least a portion of a liquid supply to one row of wells to fill or mix with liquid samples in said one row or with another row of wells which includes:

a head assembly translatable between upper and lower positions along a vertical axis;

means for moving said head assembly along said vertical axis; and a plunger assembly mounted on said head assembly for movement therewith, said plunger assembly including a row of pipette nozzles, each having a depending end to receive a tip, a row of plungers respectively disposed within said pipette nozzle, and means for moving said plungers within said pipette nozzles to vary their internal volumes to aspirate liquid into or discharge liquid from said tips, the combination of a table mounted beneath said head for translation along a horizontal bed, said table having a plurality of work stations spaced along said bed for respectively accommodating at least one row of a plurality of rows of wells in at least one tray at each of said work stations and a vessel having a plurality of troughs parallel to said plurality of rows of wells to accommodate a second plurality of said work stations;

means for moving said table along said horizontal bed selectively to place any one of said rows of wells in said at least one tray or one of said plurality of troughs at said work stations in register with said pipettes, means for controlling each of said moving means for said head assembly, plungers and said table to effect liquid transfer between said one trough and said one row of wells in a tray at said work stations, and receptacle means for storing a plurality of rows of replaceable tips for the ends of said pipettes nozzles at a third plurality of work stations on said table to permit disposal and replacement of said tips on said depending ends of said pipette nozzles with other tips disposed in at least some of the receptacles of said receptacle means between predetermined steps of a liquid transfer process.

2. Apparatus in accordance with claim 1 wherein said receptacle means for said replaceable tips are in a row positioned at one of said third plurality of work stations carried by said table.

3. Apparatus in accordance with claim 2 wherein said row at said third plurality of work stations for said receptacle means for said replaceable tips is integral with said vessel and parallel with said troughs therein.

4. Apparatus in accordance with claim 1 wherein said troughs of said vessel are of differing volumes.

* * * * *